United States Patent
Miedema et al.

(10) Patent No.: US 12,498,994 B2
(45) Date of Patent: Dec. 16, 2025

(54) COALESCING PUBLICATION EVENTS BASED ON SUBSCRIBER TOLERANCES

(71) Applicant: Ciena Corporation, Hanover, MD (US)

(72) Inventors: David Miedema, Ottawa (CA); Amit Kumar Pandey, Greater Noida (IN); Kapil Rastogi, Ghaziabad (IN); Mohit Arora, Gurgaon (IN)

(73) Assignee: Ciena Corporation, Hanover, MD (US)

( * ) Notice: Subject to any disclaimer, the term of this patent is extended or adjusted under 35 U.S.C. 154(b) by 322 days.

(21) Appl. No.: 17/465,909

(22) Filed: Sep. 3, 2021

(65) Prior Publication Data

US 2023/0022048 A1    Jan. 26, 2023

(30) Foreign Application Priority Data

Jul. 22, 2021    (IN) .............................. 202111032988

(51) Int. Cl.
  *G06F 9/54*     (2006.01)
  *G06F 7/14*     (2006.01)
  (Continued)

(52) U.S. Cl.
  CPC ............... *G06F 9/542* (2013.01); *G06F 7/14* (2013.01); *G06F 9/546* (2013.01); *G06F 16/335* (2019.01);
  (Continued)

(58) Field of Classification Search
  CPC .... G06F 2209/547; G06F 9/542; G06F 9/546; G06F 16/335; G06F 16/35;
  (Continued)

(56) References Cited

U.S. PATENT DOCUMENTS 7,995,569 B2    8/2011    Ashwood-Smith
8,364,036 B2    1/2013    Boertjes et al.
(Continued)

FOREIGN PATENT DOCUMENTS

WO    2021030170 A1    2/2021

OTHER PUBLICATIONS

S. Kul and A. Sayar, "A Survey of Publish/Subscribe Middleware Systems for Microservice Communication," 2021 5th International Symposium on Multidisciplinary Studies and Innovative Technologies (ISMSIT), Ankara, Turkey, 2021, pp. 781-785, doi: 10.1109/ISMSIT52890.2021.9604746. (Year: 2021).*

(Continued)

*Primary Examiner* — Gregory Todd
(74) *Attorney, Agent, or Firm* — Baratta Law PLLC; Lawrence A. Baratta, Jr.

(57) ABSTRACT

Systems and methods for coalescing and/or aligning publications in a publication/subscription architecture to reduce the number of publication events and to improve the performance of microservices in a communications network are provided. A method, according to one implementation, includes the step of obtaining client-based tolerance input with respect to a plurality of subscriptions requested by a plurality of clients in a publication/subscription system. Based on the client-based tolerance input, the method also includes the step of adjusting the timing of publications to reduce the phase variability of the plurality of subscriptions.

14 Claims, 7 Drawing Sheets

| CLIENT | SUBSCRPTN | FREQUENCY | JITTER TOLERANCE | SUBSCRPTN TIME | ALIGNED |
|---|---|---|---|---|---|
| A | x | 4 | 0 | 1 | 1 |
|   | y | 4 | 0 | 2 | 1 |
|   | z | 4 | 0 | 3 | 1 |
| B | m | 2 | 0 | 2 | 1 |
|   | n | 2 | 0 | 3 | 1 |
|   | o | 2 | 0 | 4 | 1 |
|   | x | 10 | 0 | 5 | 1 |
| C | x | 15 | 2 | 3 | 1 |
|   | y | 15 | 2 | 4 | 1 |
|   | z | 15 | 2 | 5 | 1 |
|   | m | 20 | 5 | 6 | 1 |

(51) Int. Cl.
  *G06F 16/335* (2019.01)
  *G06F 16/35* (2025.01)
  *G06F 16/9035* (2019.01)
  *G06F 16/906* (2019.01)
  *H04L 51/212* (2022.01)
  *H04L 67/55* (2022.01)
  *H04L 67/60* (2022.01)
  *H04L 41/0803* (2022.01)
  *H04L 41/5019* (2022.01)
  *H04L 43/087* (2022.01)

(52) U.S. Cl.
  CPC .......... *G06F 16/35* (2019.01); *G06F 16/9035* (2019.01); *G06F 16/906* (2019.01); *H04L 51/212* (2022.05); *H04L 67/55* (2022.05); *H04L 67/60* (2022.05); *H04L 41/0803* (2013.01); *H04L 41/5019* (2013.01); *H04L 43/087* (2013.01)

(58) Field of Classification Search
  CPC ...... G06F 16/9035; G06F 16/906; G06F 7/14; H04L 67/562; H04L 67/55; H04L 41/0893; H04L 41/0803; H04L 51/212; H04L 67/60
  See application file for complete search history.

(56) References Cited

U.S. PATENT DOCUMENTS

| | | | |
|---|---|---|---|
| 9,060,215 B2 | 6/2015 | Miedema | |
| 9,258,190 B2 | 2/2016 | Swinkels et al. | |
| 9,485,013 B2 | 11/2016 | Al Sayeed et al. | |
| 9,686,176 B2 | 6/2017 | Traxler et al. | |
| 9,819,565 B2 | 11/2017 | Djukic et al. | |
| 10,440,128 B2 | 10/2019 | Miedema | |
| 10,680,739 B2 | 6/2020 | Swinkels et al. | |
| 10,715,888 B2 | 7/2020 | Swinkels et al. | |
| 10,735,837 B1 | 8/2020 | Al Sayeed et al. | |
| 10,797,818 B1 | 10/2020 | Croskery et al. | |
| 10,891,176 B1 | 1/2021 | Miedema | |
| 10,958,993 B2 | 3/2021 | Swinkels et al. | |
| 10,972,359 B2 | 4/2021 | Miedema et al. | |
| 10,985,838 B1 | 4/2021 | Al Sayeed et al. | |
| 10,992,374 B1 | 4/2021 | Miedema et al. | |
| 11,588,776 B1* | 2/2023 | Sorenson, III | H04L 51/226 |
| 2008/0002711 A1* | 1/2008 | Bugenhagen | H04W 28/18 370/395.2 |
| 2010/0125671 A1* | 5/2010 | Thubert | H04W 4/38 709/230 |
| 2012/0059882 A1* | 3/2012 | Stark | H04L 12/66 709/205 |
| 2012/0075996 A1* | 3/2012 | Wan William Lau | G06F 16/335 370/235.1 |
| 2016/0350424 A1* | 12/2016 | Chen | G06F 16/9535 |
| 2018/0302487 A1* | 10/2018 | Burns | H04L 67/5651 |
| 2019/0340630 A1* | 11/2019 | Cao | H04L 67/55 |
| 2020/0252307 A1 | 8/2020 | Miedema | |
| 2021/0042172 A1 | 2/2021 | Miedema et al. | |
| 2021/0042173 A1 | 2/2021 | Prakash et al. | |
| 2021/0075877 A1 | 3/2021 | Miedema et al. | |
| 2022/0156665 A1* | 5/2022 | Beth | G05D 1/0276 |

OTHER PUBLICATIONS

Shengdong Zhang and Rui Shen "Subscription merging in filter-based publish/subscribe systems", Proc. SPIE 8768, International Conference on Graphic and Image Processing (ICGIP 2012), 87687O (Mar. 14, 2013); https://doi.org/10.1117/12.2010511 (Year: 2013).*

* cited by examiner

| CLIENT | SUBSCRPTN | FREQUENCY | SUBSCRPTN TIME | ALIGNED |
|---|---|---|---|---|
| A | x | 4 | 1 | 1 |
| A | y | 4 | 2 | 1 |
| A | z | 4 | 3 | 1 |
| B | m | 2 | 2 | 1 |
| B | n | 2 | 3 | 1 |
| B | o | 2 | 4 | 1 |
| B | x | 10 | 5 | 1 |
| C | x | 15 | 3 | 1 |
| C | y | 15 | 4 | 1 |
| C | z | 15 | 5 | 1 |
| C | m | 20 | 6 | 1 |

| CLIENT | SUBSCRPTN | FREQUENCY | JITTER TOLERANCE | SUBSCRPTN TIME | ALIGNED |
|---|---|---|---|---|---|
| A | x | 4 | 0 | 1 | 1 |
|   | y | 4 | 0 | 2 | 1 |
|   | z | 4 | 0 | 3 | 1 |
| B | m | 2 | 0 | 2 | 1 |
|   | n | 2 | 0 | 3 | 1 |
|   | o | 2 | 0 | 4 | 1 |
|   | x | 10 | 0 | 5 | 1 |
| C | x | 15 | 2 | 3 | 1 |
|   | y | 15 | 2 | 4 | 1 |
|   | z | 15 | 2 | 5 | 1 |
|   | m | 20 | 5 | 6 | 1 |

COALESCING PUBLICATION EVENTS BASED ON SUBSCRIBER TOLERANCES

TECHNICAL FIELD

The present disclosure generally relates to client-server network systems. More particularly, the present disclosure relates to coalescing or aligning publications to reduce the number of publication events and to improve the performance of microservices in a network.

BACKGROUND

Currently, a server in a network environment can be requested by a plurality of clients (or subscribers) to publish data for use by the clients. In some cases, subscribers can coordinate amongst themselves to reduce the number of subscriptions, if possible. In other cases, subscribers can make requests for specific data based on a different back-end process.

For multiple subscribers, there can be significant overlap in the data requested. In addition to overlapping data, there may also be an overlap from a timing perspective. If two clients are asking for the same data at about the same time, a server will commonly service these two clients with the same internal request and publish the same data to the clients. For cases where the data to be published is expensive to get, there can be savings in not only reducing the number of internal "get" calls for obtaining the data, but also reducing the number of publications submitted.

When clients cannot collaborate to make a common subscription list, there are cases where a publication distributing interface used for submitting subscriptions does not operate efficiently. For instance, in Google's Remote Procedure Call (RPC) Network Management Interface (gNMI), a subscription can only point to an element in a tree and its leaves. If specific multiple elements below that element are designed, the client needs to provide multiple subscriptions for multiple parts of the tree.

In conventional software architectures where subscriptions and publications are supported, clients have control over what gets published by way of subscribing to model-based paths. If the client subscribes to receive multiple paths at a certain frequency (e.g., over a period of X seconds), the timing of the publications will normally begin as soon as the subscription is made and then the next publication will be emitted X seconds after the first. Currently, there is no mechanism in conventional publication/subscription systems to align subscriptions when there is no subscriber collaboration. Therefore, there is a need in the field of publication/subscription systems to overcome the issue of non-collaborating clients to enable more efficient publication submissions, particularly to improve the efficiency of microservices provided within a network.

BRIEF SUMMARY

The present disclosure is directed to systems and methods for aligning publications in a publication/subscription environment to reduce the number of publication events and to improve the performance of microservices in a network. According to one implementation, a system includes a processing device and a memory device configured to store a computer program. For example, the computer program may include instructions that, when executed, enable the processing device to obtain client-based tolerance input with respect to a plurality of subscriptions requested by a plurality of clients in a publication/subscription system. Based on the client-based tolerance input, the instructions further enable the processing device to adjust the timing of publications to reduce the phase variability of the plurality of subscriptions.

For example, adjusting the timing of the publications may include the step of reducing the number of publication submissions without reducing the data provided by the publication submissions. Adjusting the timing of the publications may also include the step of aligning publications that are offset but have the same frequency. Also, adjusting the timing of the publications may include the step of utilizing a wall clock as a reference.

In some embodiments, the instructions may further enable the processing device to offer configuration options to the plurality of clients for obtaining the client-based tolerance input. The client-based tolerance input, for example, may include a phase alignment tolerance. Also, the client-based tolerance input may further include a jitter tolerance.

This system may further be defined whereby the instructions may enable the processing device to group subscriptions based on one or more of path information and Network Element (NE) information in a communications network. For example, the subscriptions may include Performance Monitoring (PM) data received by one or more binning applications associated with one or more of the plurality of clients.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

DETAILED DESCRIPTION

Figures 1, 2:
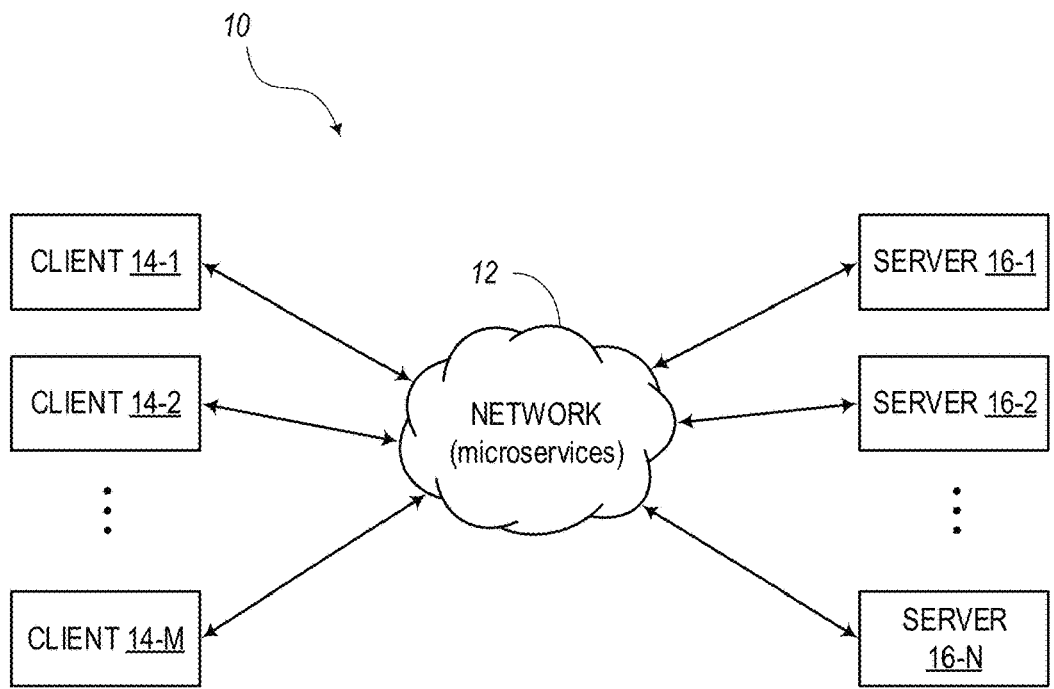
FIG. 1 is a block diagram illustrating a system having a client/service architecture, according to various embodiments.
FIG. 2 is a table illustrating an example of client-defined subscription requests, according to various embodiments.

FIG. 1 is a block diagram showing an embodiment of a system 10 having a client/service architecture. In this embodiment, the system 10 includes a network 12 for enabling the provision of multiple microservices. A plurality of clients 14-1, 14-2, . . . , 14-N (e.g., client devices) are configured to communicate with a plurality of servers 16-1, 16-2, . . . , 16-N via the network 12. Each server 16 is configured to provide various services or microservices to one or more clients 14. The servers 16-1, 16-2, . . . , 16-N may be configured to execute various programs for performing any suitable type of task, workload, operation, functionality, etc. In some embodiments, the clients 14 may request content or services from one or more servers 16 and may therefore initiate communication with the servers 16 as needed.

Also, the system 10 may be configured with a publication/subscription architecture or other suitable type of messaging arrangement. In this scenario, one or more of the servers 16 may act as publishers and one or more of the clients 14 may act as subscribers. The servers 16 may therefore submit publications without knowledge of which ones of the clients 14 may subscribe to the publications. In the pub/sub architecture where subscriptions and publications are supported, the clients 14 generally have control over what gets published by way of subscribing to model-based paths.

For example, the clients 14 may request subscriptions to any path or Network Element (NE) in the network 12. Also, clients 14 may request subscriptions to receive publication data at regular interval, referred to herein as the "frequency" of receiving publication data. The frequency refers to how often or the rate at which publications are to be obtained and may alternatively be referred to as a cycle time or period. For example, a frequency of 4 seconds refers to a four-second cycle where a publication is obtained every four seconds. Furthermore, clients 14 may request for any number of subscriptions to obtain various publication data. Different clients 14 can subscribe to different paths and/or NEs.

The many ways that clients 14 can subscribe to obtain data can typically be a challenge for the server 16 (e.g., publisher). For example, the servers 16 typically have no control over the number of subscribers requesting publications. Also, the servers 16 typically have no control over what data the subscribers may be interested in. The servers 16 typically have no control over the frequencies at which the subscribers wish to receive data. Also, the servers 16 typically have no control over when requests for subscriptions are made, which can define an original start time for dictating when subsequent publication times (e.g., based on the "frequency" component) are to be obtained.

Currently, each server 16 in the network environment can be requested by the clients 14 (or subscribers) to publish data for use by the clients. In some cases, subscribers can coordinate amongst themselves to reduce the number of subscriptions, if possible. In other cases, subscribers may make requests for specific data based on a different back-end process.

For multiple subscribers, there can be significant overlap in the data requested. In addition to overlapping data, there may also be an overlap from a timing perspective. If two clients 14-1, 14-2 are asking for the same data at about the same time from one server 16-1, the server 16-1 will often service these two clients 14-1, 14-2 with the same internal request and publish the same data to the clients. For cases where the data to be published is expensive to get, there can be savings in not only reducing the number of internal "get" calls to get the data, but also the number of publications emitted.

If a client 14 subscribes to receive multiple paths at a certain frequency (or a period of X seconds), the timing of the publications will normally begin as soon as the subscription is made and then the next will be emitted X seconds after the first. However, the embodiments of the present disclosure are able to expand upon the pub/sub arrangement by allowing subscribers to allow some flexibility in when the publications are received. In this way, the servers 16 are able to coalesce multiple publications into certain groups to simplify the "get" process and publication process. More particularly, with the consolidated publications, there may be fewer publication events, which can result in more efficient operation of the servers 16 and can be less expensive.

Conventional systems do not offer any type of mechanism to phase align subscriptions to each other or to other references. However, the embodiments of the present disclosure offer this novel functionality of aligning subscriptions based on pre-defined client-based tolerances. These tolerances relate to certain flexibility that some clients 14 may have with regard to the frequency of obtaining publications, flexibility with respect to adjusting a phase (e.g., based on an original starting time), flexibility with respect to allowing a "jitter" aspect (i.e., receiving publications at slightly different periods, such as 15 secs, 14 secs, 16 secs, etc.). Being able to align the subscriptions would allow for fewer internal queries and fewer publications or publication events.

Therefore, the system 10, which can incorporate the processing of tolerances with respect to client requests for subscriptions, can allow each of the servers 16, as applicable, to group multiple subscriptions into a smaller set. This also allows the servers 16 to phase-align subscriptions with the same or similar periods for efficiency. Furthermore, this can allow the servers 16 to adjust publication times to within a jitter tolerance specification for more efficient publications. The servers 16 can also offer the clients 14 a set of selections along with regular subscription configurations in order to receive various tolerances that each client 14 can handle. From the various tolerance information, the servers 16 can control and configure publication phases to coordinate the submission of publications and reduce the number of unnecessarily repeated publications.

According to some embodiments, the clients 14 may have collectors that are used for receiving publications and providing the publications to the respective device. In a microservice architecture, there may be many different microservices in a system talking to each other. In conventional systems, there is usually a lot less control and coordination about how the clients 14 talk to different servers 16. However, in the present disclosure, the servers 16 may receive additional information from the clients 14 for clarifying the various tolerances with respect to receiving publications at specific times, frequencies, phases, etc.

In a normal customer deployment, a server 16 can control how its clients 14 are receiving subscriptions and how often they may want publication data. However, in a microservice environment, this can be much more difficult to coordinate. This is because there is no real central authority to make sure subscriptions are managed efficiently, such as when the clients 14 connect to the server 16 and receive the publications. The embodiments of the present disclosure are configured to resolve this issue.

FIG. 2 is a table 20 illustrating an example of client-defined subscription requests. Also, FIG. 3 is a graph 30 illustrating an example of the publications based on the client-defined subscription requests of FIG. 2.

Figure 3:
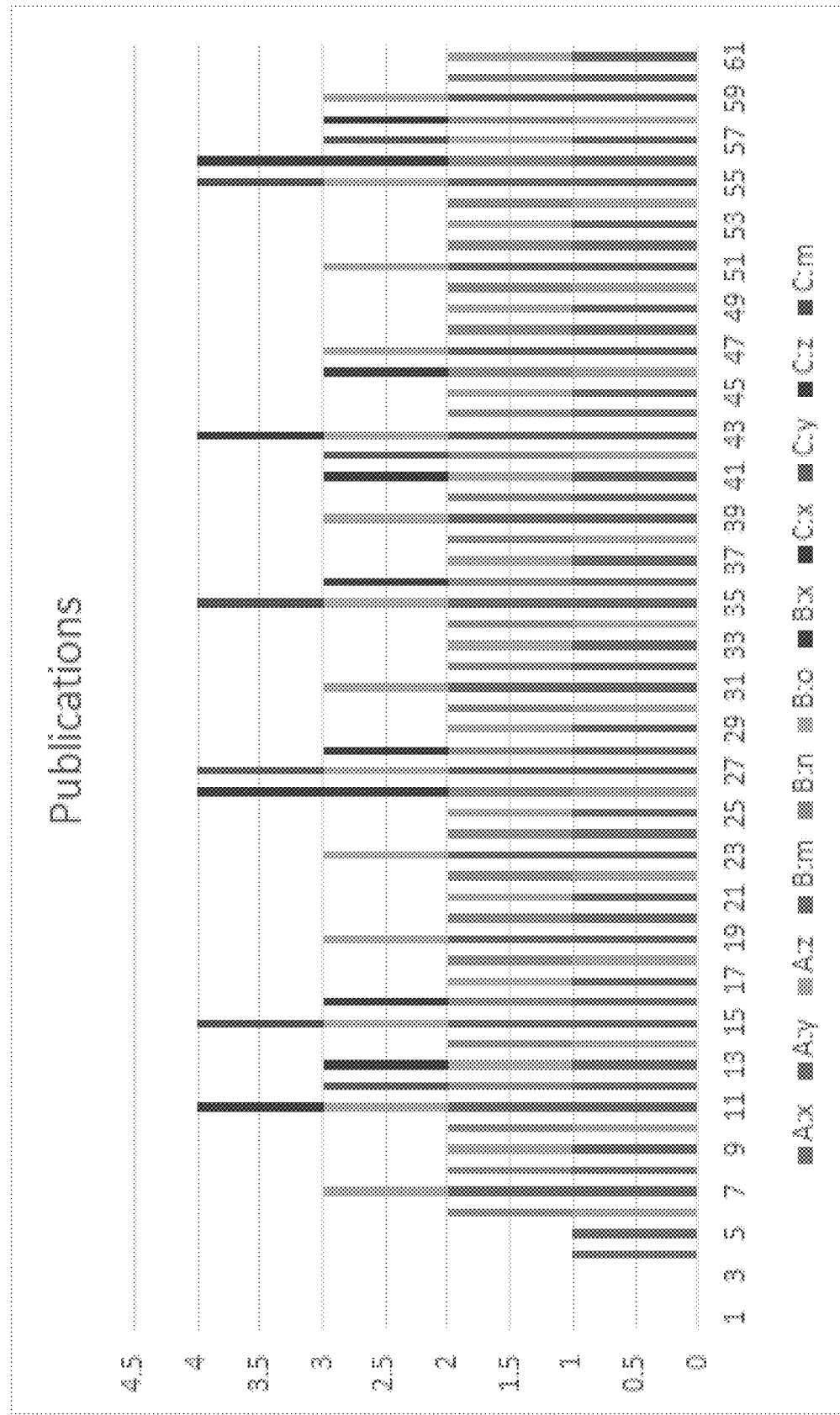
FIG. 3 is a graph illustrating an example of the publications based on the client-defined subscription requests of FIG. 2, according to various embodiments.

In the example of FIGS. 2 and 3, three clients 14 (e.g., Client A, Client B, and Client C) may all request different (or partially overlapping) subscriptions. For example, Client A request subscriptions x, y, and z; Client B requests subscriptions m, n, o, and x; and Client C requests subscriptions x, y, z, and m. These subscriptions are requested to be obtained at different frequencies, where the frequency in this example may represent any suitable unit of time (e.g., seconds). For example, Client A requests subscriptions at a frequency of once every 4 seconds. Client B requests subscriptions m, n, and o to be received at a frequency of once every 2 seconds and the subscription x at a frequency of once every 10 seconds. Client C requests subscriptions x, y, and x to be received at a frequency of once every 15 seconds and the subscription m at a frequency of once every 20 seconds.

The "sub time" of the table 20 refers to an original start time when the subscription is first received. For example, sub time may also be in any units of time (e.g., seconds). In this example, the table 20 shows the sub time as a phase offset, where the subscription x for Client A is first obtained at 1 second (after a reference time point), subscription y for Client A is first obtained at 2 seconds after the reference time, subscription z for Client A is first obtained at 3 seconds after the reference time, and so on. The subscriptions for each are then received the next time after the time designated by the frequency characteristic. The sub time may be recognized as a phase offset amount since each of the subscriptions may be requested to start at different times.

If a client requests to receive a publication every four seconds and the client is set to come in at 1 second after a predetermined time (e.g., t=1) and some other client also has a period of four seconds but is set to come in at 2 seconds after the predetermined time (e.g., t=2), the server (or publisher) may typically be publishing the same data with the same period. However, since the two clients have two different start times, the publisher in conventional systems is doing the same work twice. To avoid this process of repeating the same work unnecessarily, the present disclosure provides embodiments where the timing aspects can be controlled to correlate the same subscriptions and synchronize these subscriptions in time.

Figure 4:
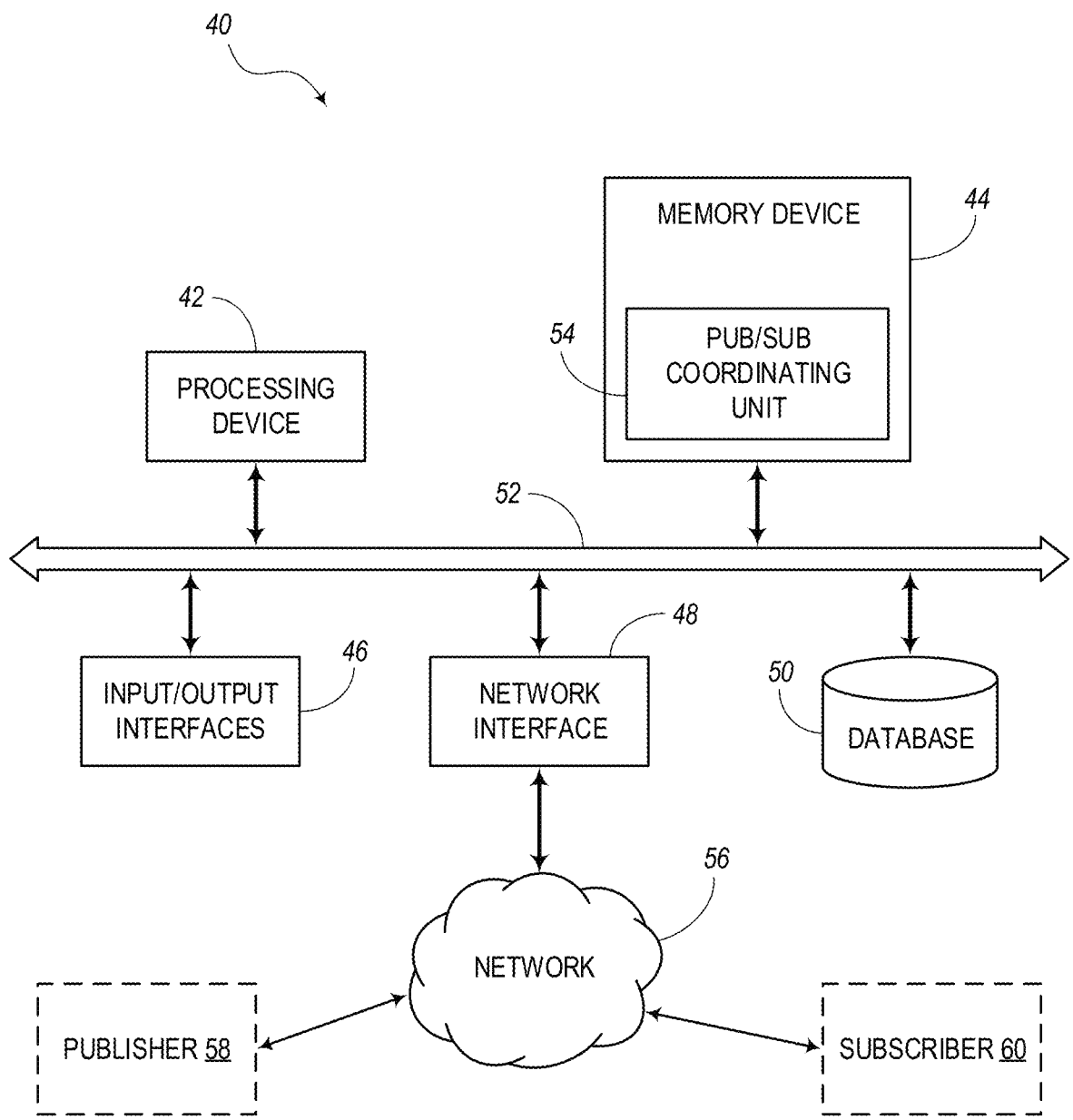
FIG. 4 is a block diagram illustrating a system for coordinating publications and subscriptions, according to various embodiments of the present disclosure.

FIG. 4 is a block diagram illustrating an embodiment of a publication filtering manager 40 for coordinating publications and subscriptions. In some embodiments, the publication filtering manager 40 may be a publication broker or publisher that works independently of the clients 14 and servers 16. In other embodiments, the publication filtering manager 40 may be one or more of the servers 16. The publication filtering manager 40 may be configured for processing publications within a network environment or microservice environment (e.g., system 10 of FIG. 1), whereby one or more publishers 58 (e.g., servers 16) are configured to publish data for one or more subscribers 60 (e.g., clients 14) via a network 56 (e.g., network 12).

In the illustrated embodiment, the publication filtering manager 40 may be a digital computing device that generally includes a processing device 42, a memory device 44, Input/Output (I/O) interfaces 46, a network interface 48, and a database 50. It should be appreciated that FIG. 4 depicts the publication filtering manager 40 in a simplified manner, where some embodiments may include additional components and suitably configured processing logic to support known or conventional operating features. The components (i.e., 42, 44, 46, 48, 50) may be communicatively coupled via a local interface 52. The local interface 52 may include, for example, one or more buses or other wired or wireless connections. The local interface 52 may also include controllers, buffers, caches, drivers, repeaters, receivers, among other elements, to enable communication. Further, the local interface 52 may include address, control, and/or data connections to enable appropriate communications among the components of the publication filtering manager 40.

It should be appreciated that the processing device 42, according to some embodiments, may include or utilize one or more generic or specialized processors (e.g., microprocessors, CPUs, Digital Signal Processors (DSPs), Network Processors (NPs), Network Processing Units (NPUs), Graphics Processing Units (GPUs), Field Programmable Gate Arrays (FPGAs), semiconductor-based devices, chips, and the like). The processing device 42 may also include or utilize stored program instructions (e.g., stored in hardware, software, and/or firmware) for control of the publication filtering manager 40 by executing the program instructions to implement some or all of the functions of the systems and methods described herein. Alternatively, some or all functions may be implemented by a state machine that may not necessarily include stored program instructions, may be implemented in one or more Application Specific Integrated Circuits (ASICs), and/or may include functions that can be implemented as custom logic or circuitry. Of course, a combination of the aforementioned approaches may be used. For some of the embodiments described herein, a corresponding device in hardware (and optionally with software, firmware, and combinations thereof) can be referred to as "circuitry" or "logic" that is "configured to" or "adapted to" perform a set of operations, steps, methods, processes, algorithms, functions, techniques, etc., on digital and/or analog signals as described herein with respect to various embodiments.

The memory device 44 may include volatile memory elements (e.g., Random Access Memory (RAM), Dynamic RAM (DRAM), Synchronous DRAM (SDRAM), Static RAM (SRAM), and the like), nonvolatile memory elements (e.g., Read Only Memory (ROM), Programmable ROM (PROM), Erasable PROM (EPROM), Electrically-Erasable PROM (EEPROM), hard drive, tape, Compact Disc ROM (CD-ROM), and the like), or combinations thereof. Moreover, the memory device 44 may incorporate electronic, magnetic, optical, and/or other types of storage media. The memory device 44 may have a distributed architecture, where various components are situated remotely from one another, but can be accessed by the processing device 42.

The memory device 44 may include a data store, database (e.g., database 50), or the like, for storing data. In one example, the data store may be located internal to the publication filtering manager 40 and may include, for example, an internal hard drive connected to the local interface 52 in the publication filtering manager 40. Additionally, in another embodiment, the data store may be located external to the publication filtering manager 40 and may include, for example, an external hard drive connected to the Input/Output (I/O) interfaces 46 (e.g., SCSI or USB connection). In a further embodiment, the data store may be connected to the publication filtering manager 40 through a network and may include, for example, a network attached file server.

Software stored in the memory device 44 may include one or more programs, each of which may include an ordered listing of executable instructions for implementing logical functions. The software in the memory device 44 may also include a suitable Operating System (O/S) and one or more computer programs. The O/S essentially controls the execution of other computer programs, and provides scheduling, input/output control, file and data management, memory management, and communication control and related services. The computer programs may be configured to implement the various processes, algorithms, methods, techniques, etc. described herein.

Moreover, some embodiments may include non-transitory computer-readable media having instructions stored thereon for programming or enabling a computer, server, processor (e.g., processing device 42), circuit, appliance, device, etc. to perform functions as described herein. Examples of such non-transitory computer-readable medium may include a hard disk, an optical storage device, a magnetic storage device, a ROM, a PROM, an EPROM, an EEPROM, Flash memory, and the like. When stored in the non-transitory computer-readable medium, software can include instructions executable (e.g., by the processing device 42 or other suitable circuitry or logic). For example, when executed, the instructions may cause or enable the processing device 42 to perform a set of operations, steps, methods, processes, algorithms, functions, techniques, etc. as described herein according to various embodiments.

The methods, sequences, steps, techniques, and/or algorithms described in connection with the embodiments disclosed herein may be embodied directly in hardware, in software/firmware modules executed by a processor (e.g., processing device 42), or any suitable combination thereof. Software/firmware modules may reside in the memory device 44, memory controllers, Double Data Rate (DDR) memory, RAM, flash memory, ROM, PROM, EPROM, EEPROM, registers, hard disks, removable disks, CD-ROMs, or any other suitable storage medium.

Those skilled in the pertinent art will appreciate that various embodiments may be described in terms of logical blocks, modules, circuits, algorithms, steps, and sequences of actions, which may be performed or otherwise controlled with a general purpose processor, a DSP, an ASIC, an FPGA, programmable logic devices, discrete gates, transistor logic, discrete hardware components, elements associated with a computing device, controller, state machine, or any suitable combination thereof designed to perform or otherwise control the functions described herein.

The I/O interfaces 46 may be used to receive user input from and/or for providing system output to one or more devices or components. For example, user input may be received via one or more of a keyboard, a keypad, a touchpad, a mouse, and/or other input receiving devices. System outputs may be provided via a display device, monitor, User Interface (UI), Graphical User Interface (GUI), a printer, and/or other user output devices. I/O interfaces 46 may include, for example, one or more of a serial port, a parallel port, a Small Computer System Interface (SCSI), an Internet SCSI (iSCSI), an Advanced Technology Attachment (ATA), a Serial ATA (SATA), a fiber channel, InfiniBand, a Peripheral Component Interconnect (PCI), a PCI eXtended interface (PCI-X), a PCI Express interface (PCIe), an InfraRed (IR) interface, a Radio Frequency (RF) interface, and a Universal Serial Bus (USB) interface.

The network interface 48 may be used to enable the publication filtering manager 40 to communicate over a network, such as the network 56 (or network 12), the Internet, a Wide Area Network (WAN), a Local Area Network (LAN), and the like. The network interface 48 may include, for example, an Ethernet card or adapter (e.g., 10BaseT, Fast Ethernet, Gigabit Ethernet, 10 GbE) or a Wireless LAN (WLAN) card or adapter (e.g., 802.11a/b/g/n/ac). The network interface 48 may include address, control, and/or data connections to enable appropriate communications on the network 56, 12.

The publication filtering manager 40 is configured to take the subscribers requests (e.g., FIG. 2 requests) and obtain additional client tolerances according to the embodiments of the present disclosure. With the regular requests plus the additional tolerance information, the publication filtering manager 40 is configured to manipulate the subscriptions within the specifications of the requests and tolerances to minimize the overhead costs with respect to publishing.

To solve the scattered publication issue and consolidate the publications into more manageable groups, the publication filtering manager 40 is configured to temporally group subscribers together where possible. This may include phase alignment and/or finding resonant periods. The publication filtering manager 40 allow clients to provide a "phase jitter tolerance" parameter. Also, the publication filtering manager 40 allows subscribers 60 to group publications together where the tolerance is not as strict. The publication filtering manager 40 is also configured to allow subscribers 60 to provide phase references and offsets where more phase control is needed.

In this respect, the embodiment of the publication filtering manager 40 of FIG. 4 may include various operating characteristics for performing various functions. For example, a pub/sub coordinating unit 54 may be implemented in the publication filtering manager 40 as software and/or firmware and stored in the memory device 44, implemented as hardware in the processing device 42, and/or implemented in any suitable combination of hardware, software, firmware, and middleware for enabling publication and subscription microservices in a communications network.

The pub/sub coordinating unit 54 may include instructions, logic, computer program functionality, etc. configured to instruct the process device 42 to perform certain processes. For example, the pub/sub coordinating unit 54 may include logic to group similar or related subscriptions into a single publication. The pub/sub coordinating unit 54 may also be configured with logic to detect similar publication frequencies and to phase align subscriptions. The pub/sub coordinating unit 54 also includes logic to allow a client to specify a jitter tolerance to allow more aggressive phase alignment.

In some embodiments, the pub/sub coordinating unit 54 may also include logic to allow a client to specify "wall clock" references and offsets. A "wall clock" may refer to a schedule of receiving data based on various times during a day or various times during an hour. For example, if a client wants data every 15 minutes and wants to receive it starting on the hour (e.g., at 0:00), then a request may include publications every hour on the hour, 15 minutes after the hour, 30 minutes after the hour, and 45 minutes after the hour. Also, another client may want data every 15 minutes but may want it starting at five minutes after the hour, which may be interpreted as a request for publications every hour at 5 minutes after the hour, 20 minutes after the hour, 35 minutes after the hour, and 50 minutes after the hour. Thus, the wall clock may be a phase reference of when client want data. As a configuration element, if one client wants wall clock timing, the system may be set up where other clients should be tolerant to sync with these times if they also want data at the same frequency (e.g., on publication every 15 minutes) and there are no specific phase criteria. From a priority point of view, when the system is performing phase alignment, if there are two (or more) clients with competing wall clock requests, then the system may not be able to perform the phase alignment steps mentioned herein since both (or all) clients cannot be satisfied in this case.

In some embodiments, the pub/sub coordinating unit 54 may be configured to allow the publication filtering manager 40 (e.g., server, publisher, broker, etc.) to group multiple subscriptions into a smaller set. The pub/sub coordinating unit 54 also allow the server, publisher, broker to phase align subscriptions with the same or similar periods for efficiency. The pub/sub coordinating unit 54 also allows the publication filtering manager 40 to adjust publication times to within a jitter tolerance spec for more efficient publications. Also, the pub/sub coordinating unit 54 provides the clients (e.g., subscriber 60) with subscription configurations to control and configure publication phases.

This allows subscribers 60 to select subscriptions for receiving publications, selecting the period of time between receipt of subsequent publications, and selecting a time when a first publication is received (which defines a start time, original time, initial time, reference time, or zeroing time for setting when subsequent publications will also be received).

The subscribers 60 may also provide (according to the present disclosure) additional request information to understand certain tolerances that the subscriber can allow. One tolerance is an alignment tolerance, where that original start time can be offset (delayed) by a certain amount in order to align with similar subscriptions where the period is the same. If the original start time (and all subsequent receiving events) is offset to align with other subscriptions of other subscribers, this will allow the publisher to submit some publications at the same time instead of different times, which can reduce the total number of publication events and reduce the get call, which can save system operations costs.

Another tolerance is a jitter tolerance. This characteristic may be defined by a determination of whether the subscriber is able to receive publications at certain times (plus or minus the scheduled receipt time), referred to in the present disclosure as "jitter," so that some receiving times may be changed slightly (before or after) with respect to the designated receipt time. This will also allow the publisher to coalesce, consolidate, group, etc. publication events into fewer events to save costs.

Also, if some amount of jitter is tolerable for a client, another client-based input may include whether or not the client can accept publication data slightly before or after the designated time, only before, or only after. Again, this is done to coalesce publications into fewer events (while still publishing the same amount of data), but just coordinating the times of publications based on the various tolerances of the clients. This will improve the overall system performance.

Tolerances may allow for changes to a more rigid requirement by some clients or to match the timing characteristics of pre-existing subscription information from other clients. Also, there may be more standardized criteria, such as having an original start time on the hour (i.e., at 0:00) instead of offset from this scheme, such as starting at five minutes after the hour. In some cases, there may be priority basis for determining which subscriptions may be changed to match others.

Not only is the publication filtering manager 40 configured to coalesce the subscriptions in a smarter way, but also it is also giving configuration options to the clients themselves to ask (or find out) how tolerant each client is to changes in the subscription characteristics, such as phase alignment and jitter.

The server has control over how to adjust publications. However, some clients may not have the ability to tolerate changes or to only tolerate minimal changes. On the other hand, other more tolerant clients may only require rough time guidelines with respect to receiving publications. For example, some clients may wish to receive data roughly every 10 minutes. In this case, the client may not care if the data is off by five or ten seconds. However, if another client needs data every 50 msecs, for example, it may not be able to allow any kind of tolerance with respect to time.

Thus, one aspect of the present disclosure is a provisional part for defining subscriptions telling the server how tolerant the clients are to offsets from an original start time and jitter. Grouping may be part of the present disclosure as well, based on the various tolerances, plus additional changes to keep track of a schedule of publications of related elements, paths, etc. more easily.

With microservices, a server might not know who the clients are. For example, some clients may be users, web pages, microservices with dependencies on other microservices, etc. There may be several different ways that subscriptions can be requested. From a client point of view, the client device may include a collector on the system side for receiving publications. In some embodiments, the collector may drive a User Interface (UI) that is configured to receive requests from a user and for getting user preferences, tolerances, etc. This can be done at design time.

For example, a server might be publishing Performance Monitoring (PM) data, such as optimal power. The collector of the client device may be configured to use a binning application configuration to collect data in bins (e.g., a 15-minute data bin). The client device may process the PM data to do certain calculations (e.g., averaging, time arcing, etc.). In order to do this, the client device may need to obtain data every 1, 2, or 5 seconds, for instance. The client device can collect the data, process the data, and summarize for another user. A control loop may be included that can look at similar data from the same service, but, instead of applying to the binning application, may perform some control functions within the system. In this case, the controlling functionality of the other client device may need to receive data at a different frequency.

In an optical network, there may be a large amount of PM data. Microservices may be used for building a Network Element (NE) software load. Clients may want the same data that may be provided to a Network Management System (NMS). The microservices can be deployed in different ways. For the server perspective, the server may not have control over how clients are going to ask for data and may not even know is a client is internal or external to the NE.

In some embodiments, the clients may also provide an indication of a tolerance to allow an "asymmetric jitter" for reception of the publication data. For example, asymmetric jitter may refer to a first aspect where a client indicates a regular jitter tolerance, which may refer to allowing a specific jitter (e.g., plus 5 seconds) for every other reading, for example. A second aspect of the asymmetric jitter may further include any type of jitter within a certain range (e.g., plus or minus ten seconds) at any time. Also, some jitter characteristics may include indicating whether it is fine to accept data late (e.g., up to positive X seconds), accept data early (e.g., up to negative X seconds), and/or both.

Figures 5, 6:
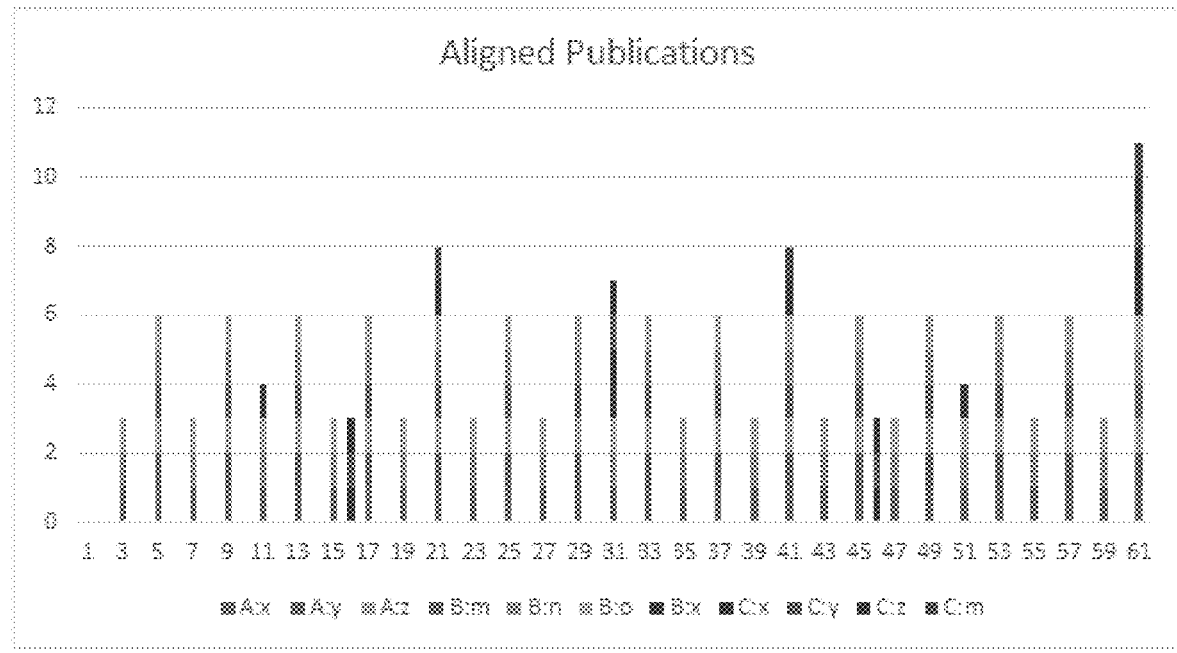
FIG. 5 is a table illustrating an example of the client-defined subscription requests of FIG. 2 with an additional entry with respect to a client-entered alignment tolerance, according to various embodiments.
FIG. 6 is a graph illustrating an example of aligned publications based on the client-entered alignment tolerance of FIG. 5, according to various embodiments.

FIG. 5 is a table 64 illustrating an example of the client-defined subscription requests of FIG. 2 with an additional entry with respect to a client-entered alignment tolerance (labelled "ALIGNED"). The aligned entry may be a binary 0 or 1 to turn on or turn off an alignment function. Also, when the alignment feature is set (e.g., equal to 1), the alignment with other similar subscriptions may override the "sub time" feature, which is intended to designate a phase offset from a reference time. Thus, it is possible for the publication filtering manager 40 to remove phase variability in the subscriptions by aligning the start times to a pre-existing subscription. This means that subscriptions with the same frequency (or period) may be realigned and triggered together.

FIG. 6 is a graph 68 illustrating an example of aligned publications based on the client-entered alignment tolerance (i.e., "ALIGNED" characteristic) of FIG. 5. Thus, the number of internal "gets" in any given period can also be reduced. By adjusting the phase slightly, it is possible to greatly reduce the number of publication events. For example, compared with the graph 30 of FIG. 3, it can be seen that the number of publication events has been cut almost in half in this example.

Figures 7, 8:
FIG. 7 is a table illustrating an example of the client-defined subscription requests of FIG. 2 with the additional entry shown in FIG. 5 and another entry with respect to a jitter tolerance, according to various embodiments.
FIG. 8 is a graph illustrating an example of aligned publications based on the client-entered alignment tolerance of FIG. 5 plus the jitter tolerance of FIG. 7, according to various embodiments.

FIG. 7 is a table 72 illustrating an example of the client-defined subscription requests of FIG. 2 with the additional ALIGNED entry shown in FIG. 5 along with another entry with respect to a "jitter tolerance." With a jitter tolerance, publications that would normally fall in their own publication cycle at certain times can be grouped with others either before or after the designate times. For example, the subscriptions x, y, and z for Client C (i.e., C:x, C:y, C:z), which has frequency of 15, is shown in FIG. 6 at time points 16, 31, 46, and 61. Time points 31 and 61 are already aligned with other publications, but time points 16 and 46 show these subscriptions by themselves. Therefore, the jitter feature in this embodiment allows adjustment of the publication time points 16 and 46 to align with other subscriptions.

FIG. 8 is a graph 76 illustrating an example of the aligned publications based on the client-entered alignment tolerance of FIG. 5 plus the jitter tolerance of FIG. 7. Particularly, the time points 16 and 46, which included C:x, C:y, and C:z beforehand have been moved slightly (jitter) to be aligned with the publications at time points 17 and 47 instead. Therefore, the jitter in this case is +1 for these particular publications for Client C.

Figure 9:
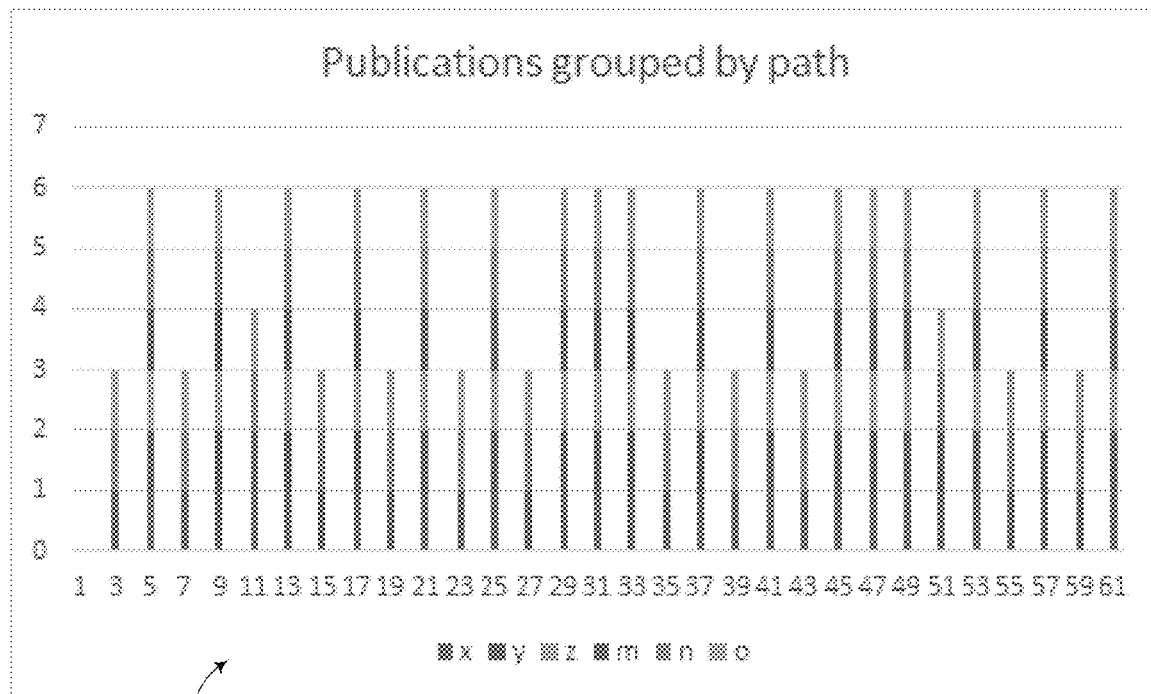
FIG. 9 is a graph illustrating an example of the graph of FIG. 8 with the publications further grouped based on path criteria, according to various embodiments.

FIG. 9 is a graph 82 illustrating an example of the graph 76 of FIG. 8 with the publications further grouped based on path criteria. In this example, the publication filtering manager 40 may be configured to group the subscriptions based on paths x, y, z, m, n, and o. In any given publish cycle, all gets for a given set of common subscriptions can be retrieved and published at the same time. The graph 82 shows one example of groupings where the same path can be retrieved and published at the same time.

Figure 10:
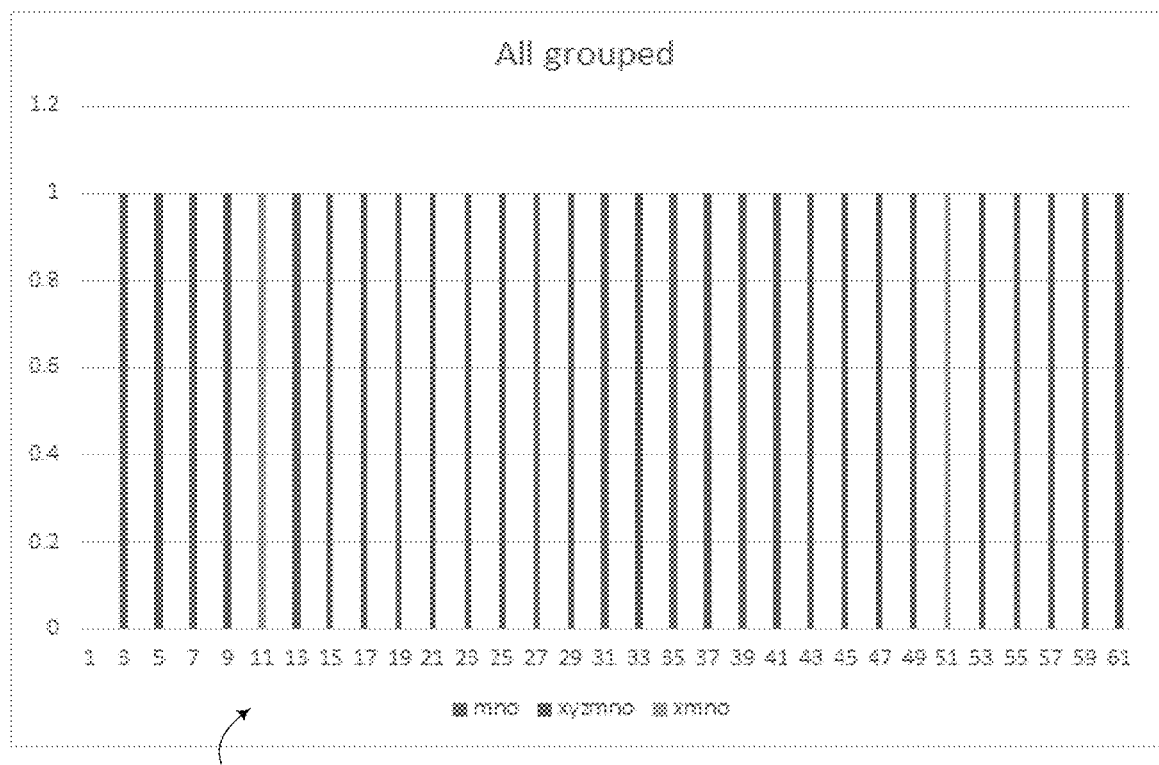
FIG. 10 is a graph illustrating an example of the graph of FIG. 9 with publications further grouped based on a grouping of paths, according to various embodiments.

FIG. 10 is a graph 86 illustrating an example of the graph 82 of FIG. 9 with publications further grouped based on a grouping of paths. The publisher can also group all paths for a given publication cycle into a single get and publish to further reduce the overhead.

In cases where more control over phase is required by the client, the publication filtering manager 40 can also introduce explicit references for subscriptions, such as: a) phase reference (e.g., absolute time to which to reference the phase), b) phase offset (e.g., relative offset from a phase reference), c) "wall-clock" based timing where finer control is needed, and others.

Figure 11:
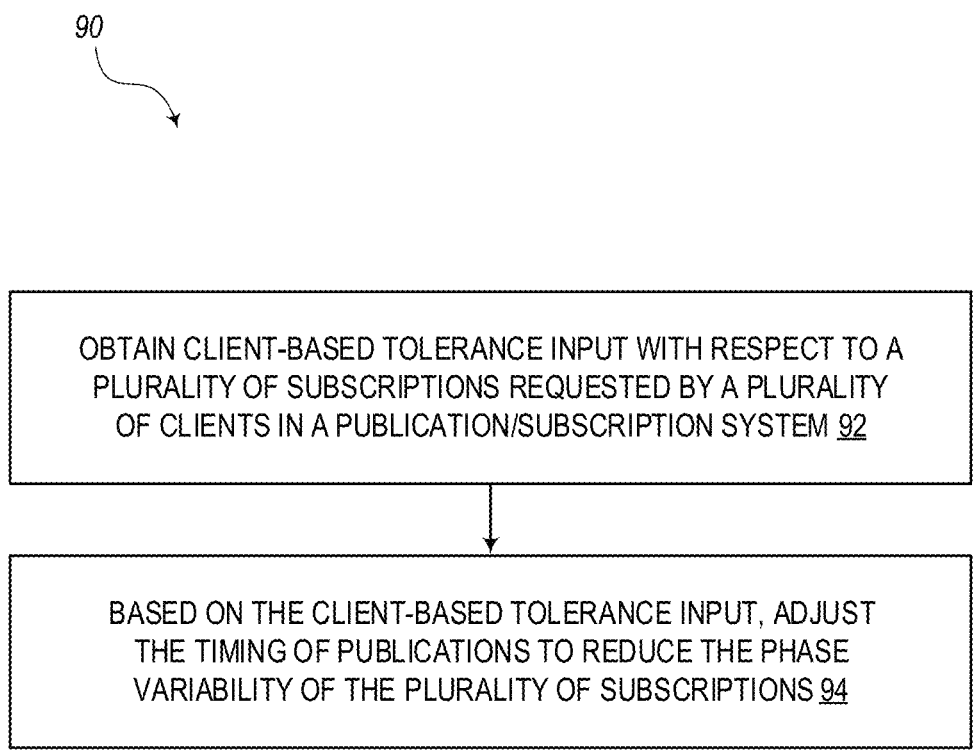
FIG. 11 is a flow diagram illustrating a process for coordinating publications in a publication/subscription system, according to various embodiments of the present disclosure.

FIG. 11 is a flow diagram showing an embodiment of a process 90 for coordinating publications in a publication/subscription system. In this embodiment, the process 90 includes the step of obtaining client-based tolerance input with respect to a plurality of subscriptions requested by a plurality of clients in a publication/subscription system, as indicated in block 92. Based on the client-based tolerance input, the process 90 is further configured to include the step of adjusting the timing of publications to reduce the phase variability of the plurality of subscriptions.

According to additional embodiments, the process 90 may further include (not shown in FIG. 11) an aspect whereby the step of adjusting the timing of the publications may further include the step of reducing the number of publication submissions without reducing the data provided by the publication submissions. The process 90 may also include an aspect whereby the step of adjusting the timing of the publications may further include the step of aligning publications that are offset but have the same frequency. The step of adjusting the timing of the publications may also include the step of utilizing a wall clock as a reference.

In some embodiments, the process 90 may further include the step of offering configuration options to the plurality of clients for obtaining the client-based tolerance input. For example, the client-based tolerance input may include a phase alignment tolerance and/or a jitter tolerance. The process 90 may also include the step of grouping subscriptions based on one or more of path information and Network Element (NE) information in a communications network. In this case, the subscriptions may include Performance Monitoring (PM) data received by one or more binning applications associated with one or more of the plurality of clients.

Described another way, the process 90 may alternatively include a step of analyzing subscription information related to a plurality of subscriptions used in a publication-subscription system where a publisher submits publications to which a plurality of subscribers subscribe. In this case, the subscription information for each subscription may include a frequency characteristic related to a frequency at which the respective subscriber receives the publication. For subscriptions having the same frequency but different phase, the alternative process may further include the step of aligning the submission of these publications with respect to phase.

According to other implementations, the process 90 may also be described as including a step of obtaining subscription request information and tolerance information from a plurality of subscribers in a publication/subscription system. Within the specifications defined by the subscription request information and tolerance information, this alternative process may further include manipulating a phase characteristic of one or more publication events to coincide with a phase of a reference publication event. In this implementation, the one or more publication events and reference publication event are configured to have the same period characteristic.

In yet another implementation, the process 90 may alternatively include a first step of aligning submission times of publication messages within a publication/subscription scheme of a communications network, wherein the submission times are aligned with respect to phase for reducing a number of publication submissions.

Therefore, according to various embodiments of the present disclosure, the systems and method described herein include a number of novel features with respect to conventional systems. For example, the present implementations are configured to reduce publication events and make publications more efficient by phase aligning and merging publications on demand. The present embodiments also allow clients to specify their tolerance to jitter introduced by automatic phase alignment. Also, clients may be allowed to specify more control parameters to control and constrain phase alignment that a server may then apply. As a result, there may be some benefits to the embodiments of the present disclosure that are not possible with the conventional systems. For example, the present embodiments can help the performance of microservices since their internal "gets" for published data would use fewer resources and there would therefore be fewer publications.

Although the present disclosure has been illustrated and described herein with reference to various embodiments and examples, it will be readily apparent to those of ordinary skill in the art that other embodiments and examples may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A system comprising:
   a processing device, and
   a memory device configured to store a computer program having instructions that, when executed, enable the processing device to
   for a plurality of subscriptions, obtain client-based tolerance input and group information, wherein the plurality of subscriptions are from a plurality of microservices operating in a network or a network element, wherein the group information includes one or more of path information and Network Element (NE) information in a communications network for grouping corresponding subscriptions of the plurality of subscriptions, and wherein the client-based tolerance input includes (1) timing information for grouping corresponding subscriptions, (2) a phase alignment tolerance whereby a given subscription can be delayed by an amount to align with similar subscriptions, and (3) a jitter tolerance whereby the given subscription that has its own publicatoin cycle can be grouped with another subscription either before or after the own publication cycle, and
   based on the client-based tolerance input and the group information, adjust timing of publications to reduce phase variability of the plurality of subscriptions.

2. The system of claim 1, wherein the timing of the publications is adjusted by reducing a number of publication submissions without reducing data provided by the publication submissions.

3. The system of claim 1, wherein the timing of the publications is adjusted by aligning publications that are offset but have the same frequency.

4. The system of claim 1, wherein the timing of the publications is adjusted by utilizing a wall clock as a reference.

5. The system of claim 1, wherein the instructions further enable the processing device to offer configuration options to a plurality of clients for obtaining the client-based tolerance input.

6. The system of claim 1, wherein the subscriptions include Performance Monitoring (PM) data received by one or more binning applications associated with one or more of a plurality of clients.

7. A non-transitory computer-readable medium configured to store computer logic having instructions that, when executed, cause one or more processing devices to:
   for a plurality of subscriptions, obtain client-based tolerance input and group information, wherein the plurality of subscriptions are from a plurality of microservices operating in a network or a network element, wherein the group information includes one or more of path information and Network Element (NE) information in a communications network for grouping corresponding subscriptions of the plurality of subscriptions, and wherein the client-based tolerance input includes (1) timing information for grouping corresponding subscriptions, (2) a phase alignment tolerance whereby a given subscription can be delayed by an amount to align with similar subscriptions, and (3) a litter tolerance whereby the given subscription that has its own publication cycle can be grouped with another subscription either before or after the own publication cycle, and
   based on the client-based tolerance input and the group information, adjust timing of publications to reduce phase variability of the plurality of subscriptions.

8. The non-transitory computer-readable medium of claim 7, wherein the timing of the publications is adjusted by one or more steps of:
   reducing the number of publication submissions without reducing data provided by the publication submissions.

9. The non-transitory computer-readable medium of claim 7, wherein the timing of the publications is adjusted by one or more steps of:
   aligning publications that are offset but have the same frequency.

10. A method comprising the steps of:
    for a plurality of subscriptions, obtaining client-based tolerance input and group information, wherein the plurality of subscriptions are from a plurality of microservices operating in a network or a network element, wherein the group information includes one or more of path information and Network Element (NE) information in a communications network for grouping corresponding subscriptions, and wherein the client-based tolerance input includes (1) timing information for grouping corresponding subscriptions of the plurality of subscriptions, (2) a phase alignment tolerance whereby a given subscription can be delayed by an amount to align with similar subscriptions, and (3) a litter tolerance whereby the given subscription that has its own publication cycle can be grouped with another subscription either before or after the own publication cycle; and
    based on the client-based tolerance input and the group information, adjusting timing of publications to reduce phase variability of the plurality of subscriptions.

11. The method of claim 10, wherein adjusting the timing of the publications includes reducing the number of publication submissions without reducing data provided by the publication submissions.

12. The method of claim 10, wherein adjusting the timing of the publications includes aligning publications that are offset but have the same frequency.

13. The method of claim 10, wherein adjusting the timing of the publications includes utilizing a wall clock as a reference.

14. The method of claim 10, further comprising offering configuration options to the plurality of clients for obtaining the client-based tolerance input.

\* \* \* \* \*